(No Model.)
J. FABER & C. HANS.
MEAT CHOPPING MACHINE.
No. 468,531. Patented Feb. 9, 1892.
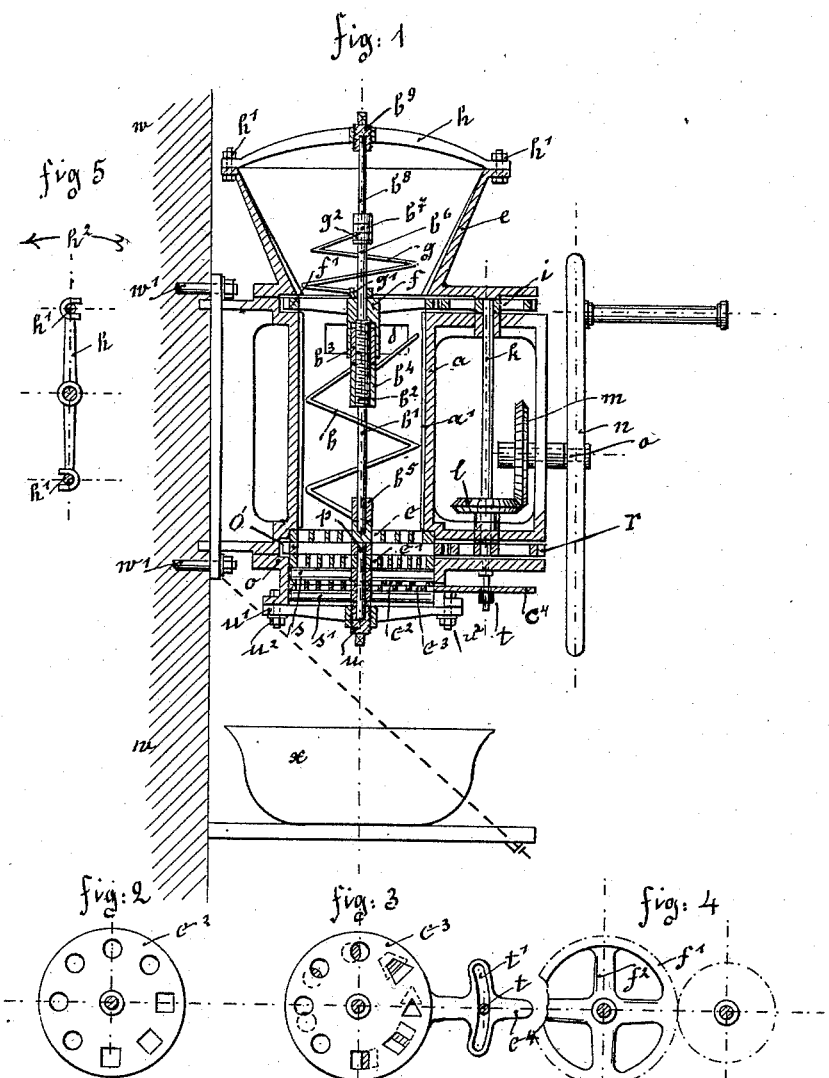

UNITED STATES PATENT OFFICE.

JACOB FABER AND CHRISTIAN HANS, OF ELBERFELD, GERMANY.

MEAT-CHOPPING MACHINE.

SPECIFICATION forming part of Letters Patent No. 468,531, dated February 9, 1892.

Application filed September 25, 1889. Serial No. 325,025. (No model.)

*To all whom it may concern:*

Be it known that we, JACOB FABER and CHRISTIAN HANS, both subjects of the Emperor of Germany, and residents of Elberfeld, Germany, have invented new and useful Improvements in Meat-Chopping Machines, of which the following is a specification.

Our invention has for its object certain improvements in meat-chopping machines, so that the grade or fineness of the chopped meat may be altered without the usual necessity of changing wheels or bolsters. Furthermore, according to our invention the pitch of the feed-worm may be readily altered, causing it to feed more or less quickly, as may be desired, and without the necessity of altering the machine's speed.

The manner in which we prefer to carry our invention into effect is shown in the accompanying drawings, of which—

Figure 1 is a section through the machine, which is shown affixed to a wall $w$, while Figs. 2 to 5 refer to certain details which will be explained hereinafter.

Like letters of reference refer to similar parts throughout the drawings.

The machine consists of a cylinder $a$, which may be clad internally with well-known corrugations or ribs $a'$, the object of which is to stop the meat. Perpendicularly in the center of the cylinder is a shaft $b'$, carrying an adjustable feed-worm $b$. The bottom of the cylinder is a perforated plate $c$, in which the bearing for the lower end of the shaft $b'$ is embedded. The shaft $b'$ is provided with a threaded boss $b^2$, on which sits a nut $b^3$, pressing on a boss $b^4$ of the elastic worm $b$. The opposite end of the worm $b$ is likewise provided with a boss $b^5$, which rests on the bearing for the lower end of shaft $b'$, which bearing is shown as formed with the bottom $c$. The boss $b^5$ is rigidly secured to the shaft $b'$, while boss $b^4$ may be moved within certain limits up and down the shaft $b'$ by means of the nut $b^3$, although both bosses turn simultaneously with $b'$. The two bosses $b^4$ and $b^5$ are thus connected with each other through the elastic worm, which has the tendency to elongate itself toward the hopper and may be tightened as required by means of the screw $b^3$, which presses on boss $b^4$. In order to be able easily to make any such regulation from the outside, an opening with a door $d$ is provided in the wall of cylinder $a$. The shaft $b'$ is lengthened farther upward into the hopper $e$, the lengthening-piece being marked in the drawings $b^6$, on which is affixed a toothed wheel $f$, which turns the shaft, and sometimes we attach an elastic worm $g$, similar in construction to the one in the cylinder and having a fixed boss $g'$ and an adjustable boss $g^2$, which can be moved up and down on the shaft $b^6$ by means of the nut $b^7$, whereby the pitch of the worm $g$ can be altered, as required. The upper end of the shaft $b'$ or its addition $b^6$ $b^8$, which is supported by the adjustable bearing, consists of the piece $b^9$, which is carried by the cross-bar $h$, attached to the upper edge of the hopper. Such cross-bar may easily be removed from the hopper by loosening the screws $h'$ and giving the bar a small turn in the direction indicated by arrow $h^2$, Fig. 5. The hopper itself is attached in a similar manner to the cylinder $a$. The shaft $b'$ receives its movement by means of the wheel $f$, the circumference of which, with the teeth, is hidden between the hopper $e$ and the cylinder $a$, as shown in the drawings, and the spokes $f^2$, Fig. 4, serve as cutters of the meat that is being pressed from the hopper into the cylinder, the meat being in this manner preliminarily cut. The wheel $f$ is driven by wheel $i$, fixed on the shaft $k$, and the latter receives its motion from the beveled gear-wheels $l$ and $m$ and fly-wheel $n$ or by any other suitable driving mechanism.

The mincing mechanisms proper are mainly affixed to the bridge $o$, which is connected with the cylinder $a$ by screws or otherwise, so that it can easily be removed. Between the said bridge and the cylinder is placed a toothed wheel $o'$, having cutting-spokes like the wheel $f$ aforementioned and being altogether arranged like that. It is fixed on the shaft $p$ and actuated from cog-wheel $r$ on shaft $k$. As shown in the drawings, the wheel $o'$ sits directly underneath the perforated disk or plate $c$. Several more sets of perforated disks with cutters fixed on the shaft $p$ may be arranged, the meat passing through one after another. In the construction a rotary cutting-knife $s$ is secured to the shaft $p$, and above this knife and below the wheel $o'$ is situated a fixed perforated disk $c'$. Below the knife or cutter $s$ are situated two perforated disks $c^2$ and $c^3$, placed in juxtaposition with a cutter $s'$ underneath. The knives $s$ and $s'$ turn with the shaft $p$, whereas the disk $c^3$ is movable on the axis $p$ by means of a lever $c^4$, which passes through the wall of bridge $o$, and, according to the position of $c^3$ to $c^2$, the perforated parts of the one may be partly covered over by the non-perforated parts of the other, the passage being free when the perforations are juxtapositioned. In Fig. 2 the holes are shown juxtapositioned, while in Fig. 3 they are shown in different positions to each other. The desired position may be fixed from the outside by means of screw $t$ and slit $t'$, Fig. 3. There may, of course, be several sets of similarly-juxtaposited disks with cutters underneath, the meat passing through one set after another. The top bearing of the axis $p$ is in the disk $c$, the lower bearing being the adjustable bearing $u$ in the cross-bar $u'$, which latter may be removed by loosening the screws $u^2$ and turning it a little, just as above described for cross-bar $h$. The shafts $p$ and $b'$ may be speeded either alike or different. In the drawings the speeds have been assumed to be different. If they are alike, then the shaft $p$ and $b'$ may be made in one piece, and in such case the wheels $i$ and $r$ might be done away with. The elastic worm $b$ acts as a regulator under certain circumstances, inasmuch as when the feed is stronger than the mincing mechanisms can deal with the meat then the latter forces itself back upon the worm, causing the worm to elongate itself, thereby feeding less quickly.

In the drawings the machine is shown attached to a wall $w$ by means of bolts $w'$, and the vessel $x$ is placed under the machine for the minced meat to drop into.

Having now described our invention, what we claim as new, and desire to secure by Letters Patent, is—

1. In a chopping-machine, the combination, with the shaft $b'$, meat-holding hopper, and chopping mechanism, of the adjustable feed-worms $g$ and $b$, as and for the purpose specified.

2. In a meat-chopping machine, the combination, with the shafts $b'$ and $p$ and the meat-holding receptacle surrounding said shafts, of the adjustable feed-worms $g$ and $b$ and the driving-gear wheels $f'$ and $o'$, having spokes formed to constitute cutters for the meat, substantially as set forth.

In testimony whereof we have signed our names to this specification in the presence of two subscribing witnesses.

JACOB FABER.
CHRISTIAN HANS.

Witnesses:
S. LANGEWIESCHE,
CARL KRUGER.